United States Patent
Sollich

[15] 3,692,451
[45] Sept. 19, 1972

[54] APPARATUS FOR PROCESSING AND CONVEYANCE OF STICKY MATERIALS

[72] Inventor: Helmut Sollich, Talle, Albernberg, Germany

[73] Assignee: Sollich oHG Industries-trasse

[22] Filed: Jan. 15, 1971

[21] Appl. No.: 106,744

[30] Foreign Application Piority Data

March 10, 1970 Germany..........P 20 11 175.5

[52] U.S. Cl..............................................425/223
[51] Int. Cl..............................................A21c 00/00
[58] Field of Search.........425/223, 84, 201, 337, 363

[56] References Cited

UNITED STATES PATENTS

| | | |
|---|---|---|
| 2,586,587 | 2/1952 | Wendt......................425/223 |
| 3,438,341 | 4/1969 | Greenberg.................425/223 |
| 3,592,129 | 7/1971 | List............................425/223 |

*Primary Examiner*—Patrick D. Lawson
*Attorney*—Christensen & Sanborn

[57] ABSTRACT

The invention describes a method for the processing and conveyancing of sticky materials such, for example, as fillings for chocolate. The invention teaches the formation of a molten layer of a first material and the sticky material is floated thereon for subsequent transport and/or treatment. The invention further discloses apparatus for carrying out the method by providing a lattice conveyor and a support plate disposed thereunder, the bottom layer being formed about said lattice conveyor and maintained in the molten state so that the layer is dragged by the conveyor over the support plate to effect transport of the same.

4 Claims, 3 Drawing Figures

PATENTED SEP 19 1972  3,692,451
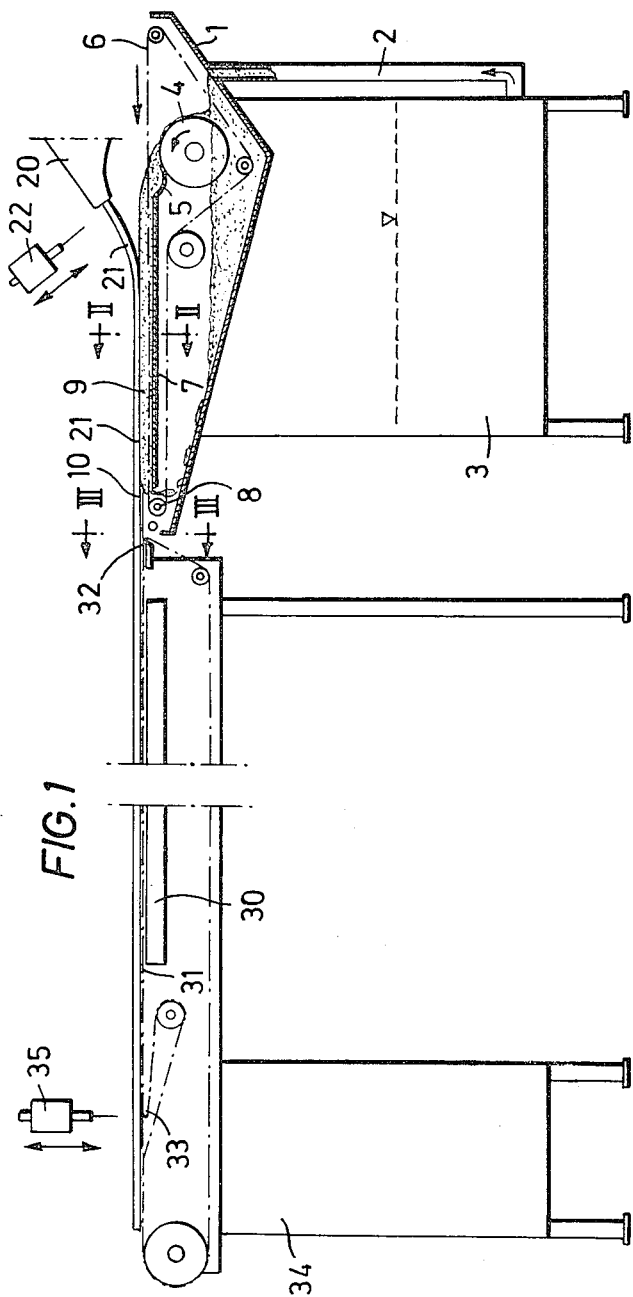
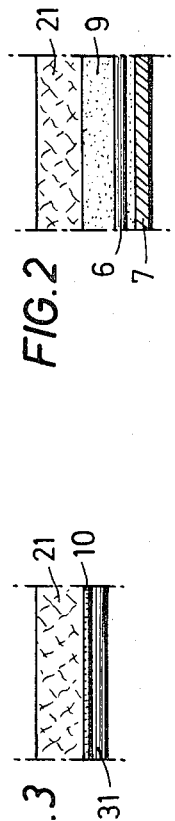
INVENTOR
Helmut Sollich
BY
Christensen and
Sanborn

APPARATUS FOR PROCESSING AND CONVEYANCE OF STICKY MATERIALS

This invention relates to a method of and apparatus for the further processing and/or conveyance of sticky materials, e.g., fillings for chocolates.

Substances of this kind frequently used in the confectionery industry, e.g., as a filling for chocolates, assume a sticky state shortly after manufacture and this greatly obstructs the further handling thereof. When substances of this kind come into contact with any type of surface after manufacture and during conveyance or further processing, they stick to such surfaces and this makes their mechanical processing very difficult. Thus, for example, in the manufacture of fillings for chocolates, the old complicated method has basically still been retained, wherein the filling is heated to convert it to a pourable condition and is then poured into moulds which have to be freshly made in a powdered starch bed for each filling and for each operation.

A method in which fillings for chocolates are made in rubber moulds has not proved satisfactory. In addition, the finished chocolate fillings or filling substances of any configuration again assume a sticky condition which make them difficult to convey on conventional confectionery conveyor belts, e.g., the lattice conveyor belts of a coating machine, because the filling substance adheres to the conveyor belt bars forming the lattice.

Similar difficulties occur to varying degrees with other sticky substances, more particularly of the kind used in the confectionery industry, e.g., whipped egg white, caramel, powdered sugar, fudge, preserved fruits and the like.

The object of the invention is to provide a method and apparatus whereby sticky substances of all kinds can without difficulty be further processed and/or conveyed despite their stickiness.

According to the present invention, there is provided a method for processing and conveying sticky materials characterized in that a first molten layer of a coating material is formed and a second layer of a sticky material is deposited and floated thereon, the first and second materials being conveyed together the first layer being allowed to solidify to provide a bottom support layer to the said sticky material, prior to being subjected to other operations.

The travelling bottom layer may consist of the coating material required for the final or intermediate product, e.g., caramel, sugar glaze and the like, and particularly chocolate, while in the case of other sticky substances not requiring a bottom coating the travelling bottom layer may include a neutral release agent, such as an oil-water emulsion. Also, according to the invention, the sticky substance provided with the bottom coating may be transferred from the bottom layer support directly to a cooling system for hardening, more particularly of the bottom coating. It is possible to deposit individual pieces or individual portions on the travelling bottom bank and an endless string or endless band of the sticky material.

The invention further includes apparatus for conveying and/or processing a sticky material, which apparatus comprises:

a substantially planar support surface plate, means for supplying a molten or fluid bottom layer of sticky or coating material to said surface, lattice conveyor means in spaced relationship with said surface and adapted to be disposed with said layer carried thereby to advance said layer from said supply means, and feed means for supplying a second layer of a sticky material, the same as or different to material of said bottom layer, to a surface of said bottom layer, the arrangement being such that the first layer having the second layer supported thereon is moved along said support plate and off an end thereof whereupon surplus material of the said bottom layer below said lattice conveyor means is caused or allowed to become detached therefrom.

Following is a description by way of example only and with reference to the accompanying drawing of one method of carrying the invention into effect.

In the drawings:

FIG. 1 illustrates a chocolate processing machine comprising a cooling system and a final treatment station.

FIG. 2 is a section on the line II — II in FIG. 1.

FIG. 3 is a section on the line III — III in FIG. 1.

chocolate feed roller 4 is arranged to rotate in the direction of the arrow in an intermediate tank 1 fed from a reservoir 3 via a pipeline 2. A stripper 5 is provided at the periphery of the feed roller 4. An endless lattice conveyor belt 6 driven in manner not shown and moving in the direction of the arrow extends above the feed roller 4 and the stripper 5. A bottom bank plate 7 is provided in extension of the stripper 5 beneath the conveyor belt and its front end extends to just in front of the forward reversing roller 8 of the conveyor belt 6.

An extruder for the filling material is disposed above the above-described device, only the nozzle 20 being shown, from which a thin wide cohesive band 21 of filling material continuously emerges. Downstream of the lattice conveyor 6 is a cooling device 30 with a conveyor belt 31, the rear end 32 of which is situated near the front reversing roller 8 and the front end 33 of which terminates at a treatment station 34 comprising tools 35.

The installation illustrated operates as follows: the feed roller 4 continuously delivers chocolate from the intermediate tank 1 to the stripper 5 at its periphery, and the stripper 5 has the effect of forming a bottom bank of chocolate on the lattice conveyor 6. This bottom bank of chocolate is moved forward by the succeeding chocolate and by the pulling action of the belt 6 so that a chocolate bottom bank 9 travelling in the direction of conveyance thus forms over the entire width of the bottom bank plate 7. The lattice conveyor belt 6 extends within this travelling bottom bank 9 so that the surface of the latter is situated over the entire length of the plate 7 above the belt 6. The band 21 of filling material emerging from the nozzle 20 is deposited — as shown in FIG. 1 — directly on the travelling bottom band 9 in such manner that the band 21 floats on the surface of the travelling bottom bank 9 and does not rest on the bars forming the lattice of the belt 6. Consequently, the band 21 of filling substance does not come into contact with any other surfaces after leaving the nozzle 20, but only with the chocolate of the travelling bottom bank 9, with which the underside of the strip of filling material is to be coated. When the band 21 of filling material has arrived above the front end of the bottom bank plate 7 where the surplus chocolate flows back into the intermediate tank 1, a coating 10 of chocolate has formed on the underside of the band 21 of filling material so that when the latter passes on to the conveyor belt 31 of the cooling system 30 at its rear end it does not come into contact with the conveyor belt surface and cannot therefore stick thereto. After passing through the cooling system, the band 21 of filling material together with the now completely hardened coating 10 on its underside, can be removed for further processing. Alternatively, the band 21 of filling material together with the hardened coating 10 can be subjected to immediate further processing at the treatment station 34 by means of the tools 35, for example be cut or stamped, a very advantageous feature being that the cutting or stamping operation has to extend only into the coating 10, which has set in the meantime, so that even then the filling material is not pressed against the working table and hence the filling material is prevented from sticking thereto.

It may be advantageous to adapt the rate of feed of the travelling bottom bank 9 to the rate of exit of the band 21 of filling material from the nozzle 20; this can be achieved by varying the circumferential speed of the feed roller 4 and/or of the belt 6.

In development of the system according to the invention, a wide nozzle 20 delivering a wide thin band 21 of filling material may be replaced by an arrangement comprising a plurality of nozzles 20 each delivering a continuous filling of circular or other cross-section. Also, each nozzle 20 may be associated with a cutting device 22 which in rapid sequence cuts discs from the continuous filling leaving the nozzle 20, such discs dropping as individual pieces on to the travelling bottom bank 9, are provided with a bottom coating 10 while floating thereon, and are delivered to the conveyor belt 31 of the cooling device 30, it being immaterial whether the individual pieces already provided with a bottom coating come briefly into contact with the belt 6 at the transfer station.

Similarly, nozzles or other delivery devices distributed over the width of the belt 6 can extrude or deliver other materials continuously or in batches and deposit them on the travelling bottom bank 9. When the articles to be manufactured are also required to be provided with a coating of chocolate, for example, on their surface, they can be passed in known manner through a chocolate curtain descending from above while they float downstream on the travelling bottom bank 9.

The travelling bottom bank 9 need not necessarily consist of chocolate although the latter is the most frequently used coating material in the confectionery industry, and it may consist of a different substance, e.g., caramel or a sugar glaze. Finally, it is possible to use a travelling bottom bank of a neutral material, e.g., an oil-water emulsion, when the intermediate or end product to be manufactured is not required to have a coating, in which case the coating 10 on the underside of the sticky material is intended solely to permit further processing and conveyance of the material.

The expression "floating" used hereinabove is to be understood as meaning that the sticky material moving downstream on the travelling bottom bank 9 has in every case a buoyancy such that the resulting reduction in weight prevents the underside of the sticky material from being pressed against the bars of the lattice conveyor 6, even if the underside accidentally comes into contact briefly with one of said bars, such possibility not being precluded by the use of the expression "floating."

I claim:

1. Apparatus for conveying and processing sticky material, which apparatus comprises a substantially planar support surface, means for supplying a molten or fluid bottom layer of a sticky or coating material to said surface, lattice conveyor means in spaced relationship with said surface and adapted to be disposed with said layer carried thereby to advance said layer from said supply means, and feed means for supplying a second layer of a sticky material to a surface of said bottom layer, the first layer having the second layer supported thereon being moved along said support surface and off an end thereof whereupon surplus material of said bottom layer below said lattice conveyor means is caused or allowed to become detached therefrom.

2. Apparatus as claimed in claim 1 wherein the supply means comprises a feed roller and a stripper plate.

3. Apparatus according to claim 2 wherein the stripper plate is attached to or forms part of said support surface.

4. Apparatus as claimed in claim 3 wherein the stripper support plate extends to a point contiguous the forward reverse roller for said conveyor.

* * * * *